(12) United States Patent
Eisen

(10) Patent No.: US 7,373,669 B2
(45) Date of Patent: May 13, 2008

(54) METHOD AND SYSTEM FOR DETERMINING PRESENCE OF PROBABLE ERROR OR FRAUD IN A DATA SET BY LINKING COMMON DATA VALUES OR ELEMENTS

(75) Inventor: Ori Eisen, Glendale, AZ (US)

(73) Assignee: The 41st Parameter, Inc., Scottsdale, AZ (US)

( * ) Notice: Subject to any disclaimer, the term of this patent is extended or adjusted under 35 U.S.C. 154(b) by 706 days.

(21) Appl. No.: 10/640,826

(22) Filed: Aug. 13, 2003

(65) Prior Publication Data

US 2005/0039036 A1 Feb. 17, 2005

(51) Int. Cl.
*H04L 9/32* (2006.01)
*G06F 17/30* (2006.01)

(52) U.S. Cl. ............................................. 726/26; 707/3
(58) Field of Classification Search ...................... None
See application file for complete search history.

(56) References Cited

U.S. PATENT DOCUMENTS

| | | | | |
|---|---|---|---|---|
| 6,523,019 | B1* | 2/2003 | Borthwick | 706/45 |
| 2003/0154214 | A1* | 8/2003 | Tu et al. | 707/104.1 |
| 2004/0030912 | A1* | 2/2004 | Merkle et al. | 713/200 |

* cited by examiner

*Primary Examiner*—Nasser Moazzami
*Assistant Examiner*—Brandon S Hoffman
(74) *Attorney, Agent, or Firm*—Wilson Sonsini Goodrich & Rosati

(57) ABSTRACT

A method of detecting fraudulent or erroneous data from a transaction data set is provided. A first transaction record having a plurality of key values is selected from a transaction record database. One of the key values is selected from the selected transaction record. The transaction record database is then queried for transaction records having the selected key value. A second database is compiled of transaction records that contain the selected key value. At least one other key value is then selected from the originally selected transaction record, and the transaction record database is again queried for transaction records also having the second key value. The results of the fist, second and any subsequent queries are added to a second or a suspect transaction database. Then, using the uncovered records, the transaction database is queried for the use of key values common to the uncovered set of transactions to see if additional records are suspect. A list of queried key values is maintained to prevent the unnecessary or redundant use of the same query of the transactions. Risk coefficients of levels of fraud or mistake are assigned to the transaction records which have one or more common key values to the records uncovered as a consequence of the database queries.

24 Claims, No Drawings

METHOD AND SYSTEM FOR DETERMINING PRESENCE OF PROBABLE ERROR OR FRAUD IN A DATA SET BY LINKING COMMON DATA VALUES OR ELEMENTS

BACKGROUND OF THE INVENTION

1. Field of the Invention

This invention relates to data analysis and more specifically to the analysis of data for possible or probable fraud or error and for correspondingly minimizing the liability and exposure of individuals and/or entities as a consequence of compromised credit card information. A single data field taken from a suspected fraudulent transaction or entry is used to track all related transactions or entries and in the case of credit card transactions used to minimize liability to the credit card company and the proper credit card holder. The invention can detect additional fraudulent or "hidden" entities which may have used a common (and probably compromised) data key value and/or element to the originally suspected fraudulent or error-containing transaction or entry. This helps to search for transactions, identities and information that otherwise wish to remain hidden. The present method can help with maintaining financial records, eliminating or reducing money laundering, tracking fraud and/or terrorism and preventing the use of compromised information in the same or other databases by those who otherwise wish to conceal their improper transactions, entries and/or identities.

2. Description of Related Art

Nearly every business and individual in the United States and around the globe depends on the accurate and secure maintenance of data such as financial and identity-related data. Data is compiled in many different formats, but one format of particular interest in remaining uncompromised and unused by unauthorized individuals is transactional data, e.g., the use of a person's credit card to purchase goods or services. It is crucial to ensure that credit card information does not become stolen, compromised or erroneously recorded. In these situations, the consumer and the credit card company suffer the loss while the thief or thieves of the information improperly use it to effectively pillage and loot (and to hide from authorities). In the case of the erroneous, in contrast to fraudulent, recordation of credit card information, while inadvertently assigning a transaction (and debiting an account) to the wrong person may be a malice-free mistake, it still causes great consternation for all parties concerned. Errors in credit card transactions have economic costs, too, and, therefore, the elimination or reduction of errors as well as fraud is desirably sought.

The review of transactional data such as on-line credit card based-purchases for error or fraud has become an important tool in rooting out terrorist operations. The Defense Advanced Research Projects Agency has recently begun a program alternatively called Total Information Awareness and the less draconian-sounding Terrorism Information Awareness (TIA) program or plan, the purpose of which is to detect and defeat a terrorist attack before it occurs by using and analyzing available databases, financial and other forms of information. One of the proposed goals of TIA is to "connect the dots" of terrorism-related activity so that the ultimate result of the activity (i.e., an attack) is not realized. The project, currently in its nascent stages, depends or will depend at least in part on analyzing data, especially transactional and credit card transactional data, to discover patterns of activity that will lead the authorities to the whereabouts and identities (and possibly their plans and objects) of terrorists and their organizations. Of course, the present invention is also applicable to matters of lesser importance than national security, e.g., determining if a stolen credit card has been used or its number compromised and unauthorizedly used one or more times by another or many others. These thieves often try to establish new transactions with the same credit card number, and/or identity. Identity theft is today a serious problem. The present invention seeks to minimize the use of key information obtained by one who improperly gains access to a credit card transaction and uses the information, not just the credit card number, to his unlawful advantage.

Transactional data can be analyzed, one transaction at a time for indications of possible fraud or error. As used herein, fraud occurs when incorrect information is deliberately included in a credit card-type or identify verifying-like transaction, typically to deceive the recipient of the data into releasing goods, services or information. The most common example is when a stolen card or number is used to buy goods over the internet (or telephone) with the goods being sent to a different address than that normally associated with the credit card holder. Error occurs when incorrect information is inadvertently included in the transactional record. For example, a single credit card transaction over the phone or internet can include a name, a billing address (including street, city, state, zip code, country, etc.), an e-mail address, a credit card number, a shipping address; and an expiration date for the credit card. The actual residence or business location for billing purposes corresponding to the zip code of the shipping address can be compared. The business address (number and street, along with town or city) can also be compared to the actual city and state corresponding to the given zip code. If there is a discrepancy, an error or fraud can be suspected. If the given zip code in the transaction corresponds to the actual zip code of the information on a database, then there is a greater possibility that the transaction is legitimate. If the transaction is being done online, the host name or number of the Internet Protocol ("IP") source address can be used with a reverse IP lookup utility database to determine if the recorded host name in the database is associated with the now given source address. This, too, can be useful in detecting error or possible fraud. Information corresponding to the automatically transmitted host name can also be compared with information manually entered in the online transaction. For example, if the host is located in Croatia and the address submitted in the transaction is Japan, then the transaction seems suspect.

Examining the information in a single transaction, as just discussed, can be useful in determining the risk of fraud or error within that transaction. However, certain transactions that contain fraudulent or erroneous information are, nevertheless, internally consistent. For example, even though a city and state address is deliberately incorrect and thus fraudulent (i.e., as entered by the thief/terrorist), the provided zip code corresponds to that city and state. Hence, there is no discrepancy between the zip code and the city and state, so the purely internal detection method discussed above would not indicate fraud or error. Likewise, the reverse IP lookup of an online transaction can reveal a host located in the same location/country as is indicated in the city and country manually submitted in the transaction, again, even though such information is fraudulent. A method is believed needed to detect possible fraud or error in transaction information, even when it is internally consistent, one record considered at a time. By linking known fraud (as when a credit card has been reported as stolen) with possible or potential fraud, eliminating or reducing fraud can be accomplished.

This, according to the present invention, is basically accomplished by connecting all of "the dots" by using information in the database in a thorough and scientific way (vs. random).

SUMMARY OF THE INVENTION

It is an object of the invention to provide a method of detecting the presence of fraudulent or erroneous data in a transaction database. Rather, once one suspicious record in a database, a credit card transaction, for example, is identified, a rogue data element is considered and used to search for related records. So, for example, if you begin with one credit card number as having thought to be compromised, the email address associated therewith can be used to determine if further usages of it may lead to other transactions which may be fraudulent. This second transaction, then, can be linked to other transactions with the same credit card or not and so on. Using that logic and method, one can build a "tree" of information that will finish "growing" when all combinations derived from the initial data element are done. Then, key values of the second or additional related transactions can be used to search the database to determine if there are additional transactions which may be suspect.

It is another object of the invention to provide a method for detecting fraudulent or erroneous data in a transaction database in which the same data queries are not run multiple times. This shows the elegance of the present invention and its efficiency of operation. It is an aspect of the present invention to ensure that the same data queries are not repeatedly "run" through the database but, rather, a listing of the data queries is maintained and each time a new query is considered, before it is run on the database, it is first checked against already considered and run queries to determine the necessity of running the query. This is efficient and methodical.

It is another object of the invention to provide a method for detecting fraudulent or erroneous data in a transaction database in which patterns of errors or fraud are detectable.

The above and other objects are fulfilled by the invention, which is a method for detecting fraudulent or erroneous data from a transaction data set. A transaction record thought to have been compromised and having a plurality of key values is selected from a transaction record database. One of the key values is selected from the selected transaction record. The entire transaction record database is then queried for transaction records having the same selected key value. Alternatively, a first record of a database could be considered, even if no fraud is suspected. Then, a first key value taken from it is used as the queried entry for other records to see if it is linked to other transactions or records. All selected key values of the first record are searched through the database. Uncovered records are added to a list. Then, the key values of those records used to search the database (avoiding duplicative queries). A listing of possible erroneous or fraudulent transactions or records is developed.

As mentioned, after the key values of the first record are searched through the database, subsequent records could be similarly used, a key value at a time, to see if possible fraud or error exists in the transaction record database or portion thereof. Another way to describe how the method of the invention is intended to work, is possibly analogizing it to tapestry. Each data or key value element can become a thread from which the entire rug of possible deceit may be woven—no matter which data element or key value you begin with of a record, you will find all related records. A second or subset of transactions of the database is thus compiled of transaction records that contain duplicates of the selected key value(s). So, for example, if the e-mail address of a user appears in two records, those records are put into a possible suspect directory or listing. If the home addresses, however, and names of the identity for the records are the same, then the records may be legitimate. However, if the names of the identities or addresses of the users in the records having the same e-mail addresses are different or their actual residences, the use of the same e-mail tends to indicate probable fraud. Looking then for additional transactions where the same e-mail address is used, or the same home residence, may uncover additional fraudulent transactions. At least one other key value is also selected from the original transaction record, and the transaction record database is queried for all transaction records having the second key value.

The results of the second and any subsequent queries are added to the second database, i.e., the possible suspect directory or listing. Each time that the main database record is considered to be queried for a key value, that query is first checked to the list of queries so that the same query will not be repeated on the database. If already done, it is not repeated. If not done, it is added to the query list and done. This is economic, efficient, and eliminates possible endless processing loops by the compiler. Thus, a list of queried key values is compiled into a key value database so as to prevent the same query from being used more than once. Risk coefficients, corresponding to probabilities of error or fraud, are assigned to the results of the queries as a listing of the transaction records satisfying the queries is compiled in the second or suspected transaction listing is created.

A new query is then made of the transaction record database with either a new key value from the same transaction record initially selected and/or with a new key value from a different record in the transaction record database. Once the second database (or suspect listing) is compiled (or while it is being compiled), risk coefficients are assigned to the transaction records in the second database based on the type, quality, or number of queried (or flagged) and common key values a given transaction record has and/or based on the number of transaction records in the second database having a given matching key value.

The key values of the transaction records in the transaction record database for credit card-type transactions correspond to identification data, including but not limited to a credit card number, a bank account number, a name, an address, an e-mail address, a telephone number, a fax number, a social security number, a merchant identification number, and a product identification number. In this way, patterns of purchasing (or transactions in general, i.e., the method and system can be used with reference to applications for passports, for a visa, for a driver's license, for loan applications to a financial institution, etc.) can be reviewed and instances of fraud or error may emerge. The method and system of the present invention can be used with multiple databases to determine possible error and fraud. The databases can be widely varied, as briefly just referred to, and more, of course. For the purposes of the present description, however, I have focused on credit card transactions for ease of illustration, it being understood, however, that the invention is far broader than that specific application.

DETAILED DESCRIPTION OF THE PREFERRED EMBODIMENT

The present invention can advantageously detect the risk of fraud or error in a record of a credit card transaction by comparing selected identification data (often referred to as "key values" of one record to the corresponding "key values" in the other records of other transactions in the database. In this connection, for example, and in specific reference to the type of transaction used for illustrative purposes, a credit card transaction, a "key value" means and includes but is not limited to a credit card number, a name, an address, an e-mail address, a "ship to" address, etc. According to the present invention, even an internally consistent transaction, for example, where the address and zip code are correct, but where the transaction is otherwise fraudulent or erroneous can be detected as a higher risk transaction.

The method and system work best when a suspected transaction of fraud is the first record to be considered and a key value selected from that transaction but the method and system can also be used on an entire database by using certain (or all) key values from any one or more records and then querying the entire database to determine instances of common usage, overlap, and possible fraud or error. In the credit card scenerio, the essence of the invention is to link known stolen credit card information or fraud with all potential or actual fraud that can be found through comparing key values, both direct matches and also by use of "like" statements for fuzzy-logic matching.

In accordance with an embodiment of the present invention, a record of each credit card transaction is stored in a database. Each record can be a correlated set of data that can correspond to a single credit card type transaction whether conducted online, by telephone, in person or in another credit card transaction. The record contains two or more fields of information, also known as "keys." For example, each record for an online type of credit card transaction can have the keys "unique record identifier;" "name of credit card holder;" "street address;" "city;" "country;" "state;" "e-mail address;" and "credit card number." The key in each of the fields of a credit card transaction record has a value, whether arithmetic, letters, symbols, or a combination of the same. For example, the "unique record identifier" key in one record may have the value "B000139;" the "name of credit card holder" key may have the value "Sanford Q. Burns" ; the e-mail address may have the value "Sburns@LLBL.com," etc. A "data set" can be compiled of all records taken from the master database having certain of the same key values or by using fuzzy logic, related or close to identical key values. The records in the master or transaction database can be reviewed and compared by using a database query language, such as SQL.

In accordance with an embodiment of the present invention, one record (in the case of credit card transactions, a suspected compromised credit card number) from an online credit card transaction database or set is selected, and a key value (for example, the credit card number or the e-mail address) for the record is selected. The initial record selected from the database or set can be one that is known or suspected to be fraudulent or erroneous. For example, a record having a credit card key value equal to a credit card number that has been reported to have been stolen can be a good candidate for the starting record. The key value that can be selected from this record can be the credit card number key value or the e-mail address of the user (or the user's name or identity).

The transaction database is then searched for all records having the same key value as the selected key value, i.e., the compromised or stolen credit card number or the e-mail address. In the above example, the transaction database or set is searched for all records having the same stolen credit card number or e-mail address. The new records so identified are copied to a second data set called the DataDistinct Data Set. A Query Listing showing each of the selected key values which are used for the search of the entire database is recorded and updated each time that the database is reviewed with a new "key value." Then, at least one other key value from the initial record (or from one of the revealed transactions which used the same credit card number) can be selected, and the transaction data set searched for all records having identical key values to the second selected key value. For example, if the initial fraudulent record, in addition to the stolen credit card number, includes an e-mail address, e.g., "ersatz64@earth.com," then all of the other records in the transaction database are searched for the value corresponding to the same e-mail address or second key value used in the transaction record having the compromised credit card number. If a second record is found with the same credit card number which was reported as stolen, then the key value, for example, of the e-mail address of that transaction, may be used to detect other transactions with the same e-mail address, even though they may not have used the same credit card number. This transaction, too, may be suspect. The entire database is searched for that key value, the list of Query Listings of key values updated, etc. The underlying assumption is that an entity submitting fraudulent transaction information may reuse at least part of the same information from transaction to transaction. When all of the key values of the initial fraudulent record have been used to find other records in the transaction database, the key values of the found records can be used as the basis for still further searching. In this way, a cluster of related fraudulent transactions can be uncovered for further investigation.

The mechanism for formulating and tracking the queries can include placing each query into a list of Query Listings or a data set called SQLCodes. In SQLCodes, the query itself can be the primary key, so that if any duplicate query (a query identical to one already asked) is generated, it cannot be added to SQLCodes, and the query is advantageously not rerun. In essence, queries can be generated much faster than new records are added to the DataDistinct Data Set. So new queries are queued in the SQLCodes data set, and can be run sequentially, or in any other suitable order.

A more detailed example follows: Consider a transaction database of online credit card transactions comprising a set that includes thousands of records, 7 of which are listed below, with each record having values for the keys values "Transaction Identifier;" "User Name;" "E-Mail Address;" and "Credit Card Number" as follows:

| Transaction Data Base | | | |
|---|---|---|---|
| Transaction Identifier | User Name | E-Mail Address | Credit Card Number |
| 1 | Alan | al@aol.com | 12345 |
| 2 | Daniel | dan@earth.com | 45287 |
| 3 | Joe | joe@aol.com | 78989 |
| 4 | Phil | joe@aol.com | 12345 |

-continued

Transaction Data Base

| Transaction Identifier | User Name | E-Mail Address | Credit Card Number |
|---|---|---|---|
| 5 | Carl | carl@sylix.com | 45287 |
| . |  |  |  |
| . |  |  |  |
| . |  |  |  |
| 164 | Tracey | alphonse@nrta.edu | 78989 |
| . |  |  |  |
| . |  |  |  |
| . |  |  |  |
| 328 | Wilma | wilma@stone.net | 78989 |
| . |  |  |  |
| . |  |  |  |
| . |  |  |  |

Record 3 is identified as a likely fraudulent transaction, for example, because credit card number 78989 has been reported as stolen. Pursuant to the method of the present invention, Record 3 is selected for use of its Key Values and application of those key values to the remainder of the database to determine whether other transactions, even if they have used other credit card numbers, are likely fraudulent:

| Transaction Identifier | User Name | E-Mail Address | Credit Card Number |
|---|---|---|---|
| 3 | Joe | joe@aol.com | 78989 |

A query is first generated to select all records from the transaction database or set (consisting, in the example, of thousands of Transaction Identifiers 1-x; although number 3 need not be considered in the next step) that have the same or a similar or fuzzy logic-related key value as a selected key value Record 3. For example, the query "SELECT Email FROM DataSet WHERE (EMAIL='Joe@aol.com')" is generated. It could, of course, be a query for the user's home address, or the IP address used for the online transaction, whatever keys and key values are maintained in the records. In the example, however, for simplicity it is the query for the e-mail name given by the user of the credit card number under consideration in the transaction. This query (for the e-mail address) is then added to an SQLCodes Data Set or Query Listing table:

SQLCodes Data Set

| Query ID# | Query | Ran |
|---|---|---|
| 1 | SELECT Email FROM DataSet WHERE (EMAIL='joe@aol.com') | No |

The Query ID# field is the query identifier, and "Ran" is an indicator or "flag" of instructions to the user or processor that indicates if the query has yet been run against the balance of the transaction database or set. The system is designed to run each of the SQLCodes Data Set queries until all Query ID#'s are reflected as "Yes" under the Ran Query. The default value of Ran can and should be "No." After the SQL query has been run (i.e., the question has been asked by the computer system of the transaction database or set and the results entered into the DataDistinct Data Set), the indicator or Ran flag is set to "Yes." When a Ran inquiry results in a NULL or empty set, the system or method is complete. Until then, each "No" indicator directs the system to run that query on the Transaction Data Base. The SQL-Codes Data Set or Query Listing field can be initially set at the primary key value, i.e. the credit card number which is thought to have been stolen or compromised. One of the advantages of using the SQLCodes Data Set is that it will enable the investigator to know whether a particular query was entered or not. Other advantages of maintaining a listing of the queried key values is to allow instant access by the investigator as to which query has already been run against the transaction database or set; to know how many queries there are; and how many have been run; and to limit the queries to one type of each (to reduce redundancy). By first setting the Query Listing field to the primary key e.g., the credit card number or the e-mail address, one also is given knowledge of which question is next (e.g., by issuing the command, "Select SQL FROM SQLCodes WHERE (Ran=No"); to know when one is finished asking questions (e.g., receiving a null return value from the query, "Select SQL FROM SQLCodes WHERE (Ran=No"); and to have an audit trail that can show how a "tree" of related records was developed by following the Query Listing or SQLCodes sequence.

After the first key value is considered for being run or after it is actually searched through the Transaction Data Base and all records with the same e-mail address posted to the DataDistinct Data Set, another key value taken from Record 3 can be used as the basis of a second query of the entire database. For example, the query "SELECT CCN FROM DataSet WHERE (CCN='78989)" is generated, where "CCN" is shorthand for "credit card number." This query is then added to the SQLCodes Data Set or Query Listing:

SQLCodes Data Set

| Query ID# | Query | Ran |
|---|---|---|
| 1 | SELECT Email FROM DataSet WHERE (EMAIL='joe@aol.com') | No |
| 2 | SELECT CCN FROM DataSet WHERE (CCN='78989) | No |

Also, the query "SELECT Name FROM DataSet WHERE (NAME=Joe)" can be generated and added to the SQLCodes Data Set or Query Listing:

SQLCodes Data Set

| Query ID# | Query | Ran |
|---|---|---|
| 1 | SELECT Email FROM DataSet WHERE (EMAIL='joe@aol.com') | No |
| 2 | SELECT CCN FROM DataSet WHERE (CCN='78989) | No |
| 3 | SELECT Name FROM DataSet WHERE (NAME=Joe) | No |

Once the initial SQLCodes Data Set or Query Listing is finished, Query ID #1 can be actually run against the entire transaction data set, and all records containing the e-mail address "joe@aol.com" are selected and copied to the Data- Distinct Data Set (which already contains the initial transaction under scrutiny). In the example, this will result in the DataDistinct Data Set looking as follows:

DataDistinct Data Set

| Transaction Identifier | Name | E-Mail | Credit Card Number |
|---|---|---|---|
| 3 | Joe | joe@aol.com | 78989 |
| 4 | Phil | joe@aol.com | 12345 |

The Transaction Identifier is the identifier for a record in the original Data Base or Set. It can be set, alternatively, as a new number for the Data Distinct Data Set. Meanwhile, the Run flag for Query 1 in the SQLCodes Data Set or Query Listing is changed to "Yes." This will prevent needlessly rerunning that query. Query 2, relating to the credit card number, can then be run, which copies two additional records (Records 164 and 328) to the DataDistinct data set:

DataDistinct Data Set

| Transaction Identifier | Name | E-Mail | Credit Card Number |
|---|---|---|---|
| 3 | Joe | joe@aol.com | 78989 |
| 4 | Phil | joe@aol.com | 12345 |
| 164 | Tracey | alphonse@nrta.edu | 78989 |
| 328 | Wilma | wilma@stone.net | 78989 |

Records 164 and 328 have no other key values in common with records 3 or 4, except the credit card key value 78989. The discovery of these additional records increases the magnitude or probability of risk associated with all of the selected records (3, 4, 164 and 328), because several apparently unrelated individuals, some with different e-mail addresses do not ordinarily share the same credit card number, unless the number is stolen and it has been compromised. Therefore, each of these transactions is assigned a "risk" of being fraudulent or erroneous, and some corrective or further investigative action can be taken. Such appropriate action can range from further investigation to automatically blocking the fulfillment of the transactions or at least until the investigation is complete.

Next, Query 3 is run, but, in our example, there is no other record in the transaction data set that has a key value of "SELECT Name FROM DataSet WHERE (NAME=Joe)". No records are added to the DataDistinct Data Set. Nevertheless, the flag for the "Ran" for Query #3 is changed to "Yes."

The same procedure can be repeated now for another record in the DataDistinct Data Set, such as Record 4. There is no need to run the e-mail address Query Listing for "SELECT Email FROM DataSet WHERE (EMAIL='joe@aol.com')", since the Query Listing or SQLCodes Data Set indicator already indicates that that query has been run. However, the Query Listing for the credit card number, SELECT CCN FROM DataSet WHERE (CCN='12345')", is added to the SQLCodes Data Set or Query Listing and then run for all remaining records. Then, the name query "SELECT Name FROM DataSet WHERE (NAME=Phil)" for record 4 is considered, first compared to the Query Listing or SQLCodes Data Set to ensure against duplication and, if not present, added to the Query Listing or SQLCodes Data Set and run. Uncovered records are added to the DataDistinct Data Set. Then, the e-mail query for the next transaction is considered, e.g., e-mail=alphonse@nrta.edu; then the CCN query CCN=78989 considered (determined to have been run), then the name query considered (name=Tracey), etc., transaction after transaction. In this fashion, all of the "leads" provided by different key values in records that are directly or indirectly related to an initial fraudulent or compromised record can be followed-up to possibly find other suspect transaction records.

This procedure can generate duplicate potential queries. For example, the key value for the credit card number CCN=78989 occurs in several of the records in the DataDistinct Data Set. So when key values in, say, Record 164 are used as the basis for new queries of the Transaction Data Set, the query "SELECT CCN FROM DataSet WHERE (CCN='78989)" will be considered, just as it was from the last field of Record 3. The present invention advantageously prevents repeat searches based upon such duplications by the use of the SQLCodes Data Set. In the SQLCodes Data Set, the query is designated to be a primary key. So any query that is a duplicate of a query already in the SQLCodes Data Set cannot be added and will not be re-run. Since the queries are run from the SQLCodes Data Set, the duplicate query will not be run. This elegant solution prevents repeat searches of the Transaction Data Set for the same records using the same keys or values.

However, duplicate records may or may not be added to the DataDistinct Data Set. In the above example, Record 4 will be selected a first time by Query 1 because Record 4 has a key value where the e-mail address joe@aol.com is present. Record 164 and 328 will be added to the DataDistinct Data Set by Query #2 because those records have key values which satisfy the Query Listing for the Credit Card Number=78989. Record #1 will be added to the DataDistinct Data Set by the Query relating to CCN=12345, because of the common use of the e-mail address to both records 3 and 4 which caused the credit card number of record #4 to be suspect and the subject of a Query Listing. Duplicate records can be excluded from the DataDistinct Data Set by making the DataDistinct Data Set record identifier the same as the transaction data set record identifier, and then making the DataDistinct Data Set and only adding to the Data Distinct Data Set when a new Transaction Identifier is located and found.

The records that have been determined to be directly or indirectly related to a bad record can, if desired, be copied into a Suspect Data Set, and can be assigned an indicator or value as to the risk associated with each record, group of records, or the whole Suspect Data Set considered highly suspect. For example, a record can be placed into a High Risk Data Set, a Medium Risk Data Set, or a Low Risk Data Set (types of Suspect Data Sets), depending upon the risk level associated with the record and the common use of the key values and their characteristics. In the above example, the Suspect Data Set may include:

Suspect Data Set

| Transaction Identifier | Name | E-Mail | Credit Card Number | Risk |
|---|---|---|---|---|
| 3 | Joe | joe@aol.com | 78989 | High |
| 4 | Phil | joe@aol.com | 12345 | High |

-continued

| Suspect Data Set | | | | |
|---|---|---|---|---|
| Transaction Identifier | Name | E-Mail | Credit Card Number | Risk |
| 164 | Tracey | alphonse@nrta.edu | 78989 | Medium |
| 328 | Wilma | wilma@stone.net | 78989 | Medium |

The indications of risk level can be made in accordance with any suitable rule. In this example, a record that an e-mail address with a different name and credit card number may be considered a risk level of "High." A record that shares the credit card key value with no more than one other key value of a record is accorded a risk level of "Medium" since many family members may share a credit card but have different e-mail addresses and names. Transactions can be treated according to their risk level. For example, high risk transactions can be automatically rejected. Medium risk transactions can be referred to a human researcher for further investigation. Low risk transactions can be automatically accepted and processed.

The description of embodiments is meant to illustrate, and not to limit, the true scope of the invention. Those of ordinary skill in the art will appreciate that the scope of the invention extends beyond the examples discussed above. For example, a key value can be used as the basis for searching for similar key values in other records in the transaction data base or set, not only identical records. Also the keys can be searched in multiple databases, such as looking for people with the claimed same SSN, Driver License numbers and Passports and all their combinations. There can be different similarity rules for different key values. For example, a single digit difference in credit card numbers in two records can indicate that two entirely different credit cards were legitimately used in two transactions. However, the name "Al Wilkinson" in one record may be deemed sufficiently similar to the name "A Wilkinson" in another record to select the two records and copy them to the Suspect Data Set. Known techniques, including those involving fuzzy logic, can be advantageously used to match key values in accordance with an embodiment of the present invention.

In the example above, for example, the uncovering of 78989 as the value for several credit card numbers in a few transactions may cause the method to run a Query Listing where e-mail name is "alphonse@nrta.edu" or wilma@stone.net. If the DataDistinct Data Set results in additional transactions which use the same CCN, the same e-mail name values, but different name values, these transactions, too, can be added to the Suspect Data Set. As transactions and key values are added to the Data Distinct Data Set of transactions, the system keeps on looking in the SQLCodes for new key values.

To start the present invention and method, one places a SQL Key Value of a Transaction into the SQL Codes Data Set or Query Listing with the Ran indicator set to "No," this is what makes the system start with that key value and query and keeps looking for other records using the same key values and then uses other value keys from the same record for building a DataDistinct Data Set. Then, after that first record and its key values are considered for the entire Transaction Data Set, the next record of the Data Distinct DataSet is considered, first by use of its, for example, e-mail name, then its credit card number, CCN, finally its user's name. If not yet used and run, then it is run through the entire Transaction Data Set. If already used and run, determined by comparison to the Query Listing, then the next query listing is used. So at first the system is run with the key value seeking other transactions with the same e-mail address: joe@aol.com. This may or may not uncover other records but if it does, they are added to the DataDistinct Data Set. Then the system looks for the common transactions with CCN of the first transaction and records them, too, unless already indicated on the Data Distinct Data Set. Then, the database is run for the Name key value. After those logic runs are performed, the next transaction recorded in the DataDistinct Data Set is looked at. If the e-mail query is the same as that already done, it is not redone. Then, the system moves onto the CCN query and then the name query, each time looking at all transactions, each time indicating on the SQLCodes Data Set or the Query Listing which queries have already been done, each time changing the query from Ran=No to Ran=Yes. When all key values of all transactions on the Data Distinct Data Set have been performed the results are ranked by probabilities of fraud. When Ran=No equals NULL, i.e., all Queries have been done such that no additional queries need to be run, the system is finished, as there are no more combinations that stem form the initial suspect transaction.

In one embodiment, wildcards can be used to detect similar (as well as identical) records. For example, if numerous bad transactions have been detected with e-mail key values that conform to *@whodunnit.com, where "*" is a wildcard, that can represent any string of any length, then a query can be formulated: SELECT Email FROM DataSet WHERE (EMAIL IS LIKE "*@whodunnit.com").

This query can advantageously identify all records having e-mail key values with the domain name "whodunnit.com", such as "al@whodunnit.com" smith@whodunnit.com", etc. Likewise, any wildcard can be used in formulating such queries. For example, "!" can represent any single character.

Likewise, Boolean expressions can be used in queries. For example, SELECT Email FROM DataSet WHERE (EMAIL='*@whodunnit.com' AND NOT 'joesmith@whodunnit.com'). This query could be used where the only known legitimate user of an e-mail address containing "whodunnit.com" is userjoesmith. Other Boolean expressions (e.g., AND, OR, etc.) can also be used.

By developing clusters of related transactions, patterns can begin to emerge. For example, if the same credit card number is used over disparate geographical areas at substantially the same time, fraud is suspected. Alternatively, if the credit card number is used to purchase repeated quantities of legal but dangerous materials (e.g., fertilizer and kerosene), a danger signal or flag may be raised that terrorist activity may be afoot.

Having described the invention with regard to specific embodiments, it is to be understood that the above description is not meant as a limitation excluding such further variations or modifications as may be apparent or may suggest themselves to those skilled in the art. The invention is defined by the claims appearing herein below.

What is claimed is:

1. A method of detecting fraudulent or erroneous data from a transaction data set, comprising the steps of:
   a) selecting a transaction record from a first database comprising a plurality of transaction records for detecting fraudulent or erroneous data, each of the plurality of transaction records having a plurality of key values;
   b) selecting a first key value from the transaction record selected in step a);

c) querying the first database for transaction records having the same or related first key value selected in step b);
d) compiling a second database of transaction records taken from the first database that contain the selected first key value;
e) selecting at least one other key value from the transaction record selected in step a);
f) compiling a list of queried key values into a key value query database;
g) querying the first database for transaction records having the other key value selected in step e); and
h) adding the results of step g) to the second database.

2. A method according to claim 1, further comprising the steps of:
i) comparing a selected query of key values against the key value query database, wherein if a query containing a selected key value has been run, a query with that selected key value will not be run again.

3. A method according to claim 2, wherein said key value query database is written in a structured query language.

4. A method according to claim 3, wherein each query in the key value query database is assigned a run value indicative of whether the query has been run against the first database.

5. A method according to claim 1, wherein at least steps b)-d) are repeated with a new key value from the transaction record selected in step a).

6. A method according to claim 5, wherein at least steps b)-g) are repeated with a new key value from the first database.

7. A method according to claim 6, further comprising the step of assigning a risk coefficient to a transaction record in the second database based on the number of queried key values a given transaction record evidences.

8. A method according to claim 6, further comprising the step of assigning a risk coefficient to a transaction record in the second database based on the number of transaction records in the second database having a given matching key value.

9. A method according to claim 5, further comprising the step of assigning a risk coefficient to a transaction record in the second database based on the number of queried key values a given transaction record evidences.

10. A method according to claim 5, further comprising the step of assigning a risk coefficient to a transaction record in the second database based on the number of transaction records in the second database having a given matching key value.

11. A method according to claim 1, wherein at least steps b)-g) are repeated with a new key value from the first database.

12. A method according to claim 11, further comprising the step of assigning a risk coefficient to a transaction record in the second database based on the number of queried key values a given transaction record evidences.

13. A method according to claim 11, further comprising the step of assigning a risk coefficient to a transaction record in the second database based on the number of transaction records in the second database having a given matching key value.

14. A method according to claim 1, wherein the key values of the transaction records in the first database comprise identification data.

15. A method according to claim 14, wherein the identification data corresponds to at least one of a credit card number, a bank account number, a name, an address, an e-mail address, a telephone number, a fax number, a social security number, a merchant identification number, and a product identification number.

16. A method according to claim 1, further comprising the steps of selecting a transaction record from the second database; selecting a third key value from the transaction record selected from the second database, the third key value being distinct from the first and second key values; and querying the first database for other transaction records having the third key value.

17. A method of detecting fraudulent or erroneous data from a transaction data set, comprising the steps of:
a) selecting a transaction record from a first database comprising a plurality of transaction records for detecting fraudulent or erroneous data, each of the plurality of transaction records having a plurality of key values;
b) selecting a first key value from the transaction record selected in step a);
c) querying the first database for transaction records having the same or related first key value selected in step b);
d) compiling the results of step c) to a second database;
e) selecting at least one other key value from the transaction record selected in step a);
f) compiling a list of queried key values into a key value query database;
g) querying the first database for transaction records having the other key value selected in step e); and
h) adding the results of step g) to the second database.

18. A method according to claim 17, further comprising:
i) comparing a selected query of key values against the key value query database, wherein if a query containing a selected key value has been run, a query with that selected key value will not be run again.

19. A method according to claim 17, further comprising: assigning a risk coefficient to a transaction record in the second database.

20. A method according to claim 17, wherein the key values of the transaction records in the first database comprise identification data.

21. A method of detecting fraudulent or erroneous data from a transaction data set, comprising:
selecting at least one transaction record containing possible fraudulent or erroneous data from a first database comprising a plurality of transaction records, each of the plurality of transaction records having a plurality of key values;
selecting at least one key value from the selected at least one transaction record;
querying the first database for transaction records having the same or related at least one selected key value;
compiling the querying results into a second database; and
adding the queried at least one key value into a key value query database.

22. A method according to claim 21, further comprising: comparing a selected query of key values against the key value query database, wherein if a query containing a selected key value has been run, a query with that selected key value will not be run again.

23. A method according to claim 21, further comprising: assigning a risk coefficient to a transaction record in the second database.

24. A method according to claim 21, wherein the key values of the transaction records in the first database comprise identification data.

* * * * *

UNITED STATES PATENT AND TRADEMARK OFFICE
CERTIFICATE OF CORRECTION

PATENT NO.        : 7,373,669 B2
APPLICATION NO.   : 10/640826
DATED             : May 13, 2008
INVENTOR(S)       : Ori Eisen It is certified that error appears in the above-identified patent and that said Letters Patent is hereby corrected as shown below:

Column 13, line 29, please change "claim 5" to --claim 1--.

Column 13, line 32, please change "claim 6" to --claim 5--.

Column 13, line 36, please change "claim 6" to --claim 5--.

Column 13, line 39, please delete "transaction records in the second database having a given matching key value" and insert --queried key values a given transaction record evidences--.

Column 13, line 41, please change "claim 5" to --claim 6--.

Column 13, line 45, please change "claim 5" to --claim 7--.

Column 13, line 47, please delete "transaction records in the second database having a given matching key value" and insert --queried key values a given transaction record evidences--.

Column 13, line 50, please delete "A method according to claim 1, wherein at least steps b)-g) are repeated with a new key value from the first database" and insert --A method according to claim 5, further comprising the step of assigning a risk coefficient to a transaction record in the second database based on the number of transaction records in the second database having a given matching key value--.

Column 13, line 53, please change "claim 11" to --claim 6--.

Column 13, line 55, please delete "queried key values a given transaction record evidences" and insert --transaction records in the second database having a given matching key value--.

UNITED STATES PATENT AND TRADEMARK OFFICE
CERTIFICATE OF CORRECTION

PATENT NO. : 7,373,669 B2
APPLICATION NO. : 10/640826
DATED : May 13, 2008
INVENTOR(S) : Ori Eisen It is certified that error appears in the above-identified patent and that said Letters Patent is hereby corrected as shown below:

Column 13, line 57, please change "claim 11" to --claim 7--.

Signed and Sealed this

Twenty-ninth Day of July, 2008

JON W. DUDAS
*Director of the United States Patent and Trademark Office*